US006238732B1

(12) United States Patent
Cameron et al.

(10) Patent No.: US 6,238,732 B1
(45) Date of Patent: May 29, 2001

(54) METHOD FOR MAKING HOT MELT ADHESIVE PELLET COMPRISING CONTINUOUS COATING OF PELLETIZING AID

(75) Inventors: Janelle C. Cameron, Mendota Heights; Carolyn A. Fischer, Stillwater; Nicholas C. Lehman; Jeffrey S. Lindquist, both of Maple Grove; Christopher E. Olson, Woodbury, all of MN (US); Steve A. Fox, Hickory, NC (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/583,937

(22) Filed: May 31, 2000

Related U.S. Application Data

(60) Division of application No. 09/168,830, filed on Oct. 8, 1998, now Pat. No. 6,120,899, which is a continuation-in-part of application No. 09/090,473, filed on Jun. 4, 1998, now abandoned, which is a continuation-in-part of application No. 08/751,828, filed on Nov. 18, 1996, now Pat. No. 5,869,555.

(51) Int. Cl.$^7$ ............................................. B05D 5/10
(52) U.S. Cl. ..................... 427/208.2; 264/130; 264/131; 427/222
(58) Field of Search .................................. 264/130, 131; 427/208.2, 222

(56) References Cited

U.S. PATENT DOCUMENTS 5,695,881 * 12/1997 Henderson et al. .

* cited by examiner

Primary Examiner—Bernard Pianalto
(74) Attorney, Agent, or Firm—Nancy Quan

(57) ABSTRACT

This invention relates to a hot melt adhesive composition in pellet form. The hot melt adhesive composition is pressure sensitive, having a storage modulus, G', at 25° C., of less than about $5 \times 10^6$ dynes/cm$^2$. The pellets are coated with a pelletizing aid on the surface at a concentration preferably ranging from about 1 wt-% to about 30 wt-%. The pelletizing aid is a hot melt adhesive component or a material which does not substantially adversely affect the adhesive properties. The pellets are free-flowing and have a substantially tack-free surface

19 Claims, 4 Drawing Sheets

METHOD FOR MAKING HOT MELT ADHESIVE PELLET COMPRISING CONTINUOUS COATING OF PELLETIZING AID

RELATED APPLICATIONS

The application is a Division of 09/168,830, filed Oct. 8, 1998, U.S. Pat. No. 6,120,899 which is a Continuation-In-Part of Ser. No. 09/090,473, filed Jun. 4, 1998, abandoned which is a CIP of 08/751,828, filed Nov. 18, 1996, U.S. Pat. No. 5,869,555 all three incorporated herein by reference.

FIELD OF THE INVENTION

This invention relates to a hot melt adhesive composition in pellet form. The hot melt adhesive composition is pressure sensitive, having a storage modulus, G', at 25° C., of less than about $5 \times 10^6$ dynes/cm$^2$. The pellets are coated with a pelletizing aid on the surface at a concentration preferably ranging from about 1 wt-% to about 30 wt-%. The pelletizing aid is a hot melt adhesive component or a material which does not substantially adversely affect the adhesive properties. The pellets are free-flowing and have a substantially tack-free surface.

BACKGROUND OF THE INVENTION

Hot melt adhesives (HMA's) are solid at room temperature and are generally applied to a substrate while in a molten state. Hot melt adhesives can be characterized into two types, hot melt pressure sensitive adhesives (HMPSA's) which are tacky to the touch even after the adhesive has solidified and non-tacky hot melt adhesives which will be denoted as simply HMA's. HMA's have been packaged in a variety of forms ranging from small pellets which can be vacuum fed into a melting device, to drum sized quantities. The packaging of HMA's has typically been unproblematic, since after the adhesive is solidified, it will maintain its shape and not adhere to the container, other pieces of hot melt, the operator's hands, machinery, etc. until remelted. Underwater pelletizing devices as well as stripforming or rotoforming HMA's onto a cooled belt have been used extensively for packaging these types of products.

HMPSA's on the other hand, present a variety of challenges. Historically, these adhesives were, and continue to be, provided in the form of blocks. Due to the tacky nature of these materials, there are problems associated with handling and packaging them. The solid HMPSA blocks not only stick to each other and adhere to the operator's hands and mechanical handling devices, but they also pick up dirt and other contaminants. Additionally, certain high tack formulations result in blocks that will deform or cold flow unless supported during shipment. The needs and advantages for providing tackless or nonblocking hot melt pressure sensitive adhesive forms and packages are apparent and various ways of accomplishing this have been developed.

EP 0115307, published Jan. 1, 1984, relates to contacting a stream of molten adhesive with a polymeric dispersion. The examples found on p. 10 and 11 utilize about 40% by weight and about 20% by weight of the parting agent in water. This process is used for "reducing the tackiness of a hot melt adhesive in slat form". Seep. 3 lines 17–18.

In German patent 22 48 046, the hot melt adhesive is squeeze-cut into pillow-shaped pieces, the pieces subsequently cooled and solidified.

U.S. Pat. No. 3,723,035 to Franke teaches an apparatus for an improved method of packaging hot melt adhesives. This machine produces what is known in the art as "pillows." For pressure sensitive adhesives that are manufactured with this method, it is known to coextrude a non-tacky coating on the exterior of the pillow to prevent the individual pillow-shaped pieces from subsequently blocking together. The coextrusion coating may comprise a single component such as polyethylene polymer, or polymer, tackifier and wax. This coating then prevents the "pillows" from blocking together into a solid mass at room temperature.

WO 96/00747 published Jan. 11, 1996 teaches a process for coating hot melt adhesives to provide a tackless surface. In this method, molten film is sprayed onto the surface of an extruded adhesive. The surface of the coated adhesive is then heated to a temperature for a period of time sufficient to remelt the film forming polymer so as to form a continuous coating thereof but which process is insufficient to appreciably melt the adhesive. The example teaches a coating of approximately 3 mils (0.08 cm) applied to the hot melt adhesive.

Other references pertain to certain hot melt compositions in pellet form and/or methods of pelletizing hot melt adhesives.

U.S. Pat. No. 5,057,571 to Malcolm et al. discloses, at column 8 line 59 to column 9 line 14, a method for pelletizing a preblend of a radial block copolymer and a tackifying resin. This preblend is then used to make hot melt adhesives for disposable article construction. The preblend is manufactured on an extruder and pelletized and then subsequently added to a conventional hot melt mixer and combined with additional ingredients to make a finished adhesive composition. "The handling of the preblend pellets can be improved by treating the surface of the pellets with a nontacky inorganic coating. Such coating can comprise aqueous dispersions of water insoluble waxes, fatty acid esters, and other known anti-blocking agents. Useful anti-blocking agents can include such materials as silica, talc, gypsum, calcium oxide, magnesium oxide, etc." (Column 9, lines 1–8).

U.S. Pat. Nos. 4,645,537 issued Feb. 24, 1987; 4,576,835 issued Mar. 18, 1986 and 4,774,138 issued Sep. 27, 1988 all to Gardenier et al. teach aqueous release agents for temporary antiadhesive surface-finishing of tacky hot melt adhesives to be processed into pellets, granulates, cubes, flakes and the like. No specific hot melt compositions are taught.

EP 0 410 914 A1 published Jan. 30, 1991 teaches a two step process of making nontacky plastic particles by first extruding molten plastic material into contact with a cooling fluid containing a non-sticky material that is compatible with the plastic material, cutting the plastic material into particles, separating the particles from the cooling fluid and then contacting these particles with a second compatible non-sticky material. At column 6, lines 45–49, it is stated, "Examples of suitable non-sticky materials include powders, silicones, and surfactants. The preferred non-sticky materials are powdered polyolefins. More preferred powders are powdered polyolefin waxes."

Collectively, the art teaches pelletizing adhesives using methods which employ waxes, silicones or surfactants as pelletizing aids to detackify the surface. these types of materials are low in molecular weight. Additionally, the majority of such ingredients, with the exception of some waxes, tend to comprise polar constituents. Accordingly, waxes, silicones and surfactants typically bloom to the surface causing detackification of the pressure sensitive adhesive, unless employed at only very low concentrations.

Further, various pelletizing aids and methods of pelletization have been taught in the art for various polymers and elastomers.

For example, U.S. Pat. No. 4,359,492, issued to Schlademan Nov. 16, 1982 teaches that thermoplastic elastomers useful in formulating certain pressure sensitive hot melt adhesives are normally very tacky and thus are hard to handle. Thus, the patent relates to a method of eliminating problems due to this tackiness by dusting the elastomer pellets with a friable polymer resin having a ring and ball softening point of at least 95° C. Exemplified is a tacky styrene-isoprene block copolymer consisting of 15% by weight styrene and 85% by weight isoprene extruded into strand having a diameter of about ⅛" (about 3 mm). The strands were coated by being dusted with a powder made by pulverizing a poly-alpha-methylstyrene resin having a ring and ball softening point of 141° C. The dusted strands contained less than 2% by weight of the resin and were chopped in a paper cutter to form free-flowing pellets. "Similar, but slightly less effective, results were obtained by dusting the strands of tacky polymer with powdered polyterpene resin having a softening point of about 95° C."

However, Comparative Example 3, of U.S. Pat. No. 5,322,731 issued to Callahan Jr. et al., Jun. 21, 1994; describes the formation of adhesive beads comprising pressure sensitive adhesive cores surrounded by an essentially discontinuous organic rosin ester powder coating. A dispersion of filtered adhesive cores and Foral 85 55 WK at a 4% loading, dry weight basis with regard to the adhesive cores was agitated at about 400 rpm and 65° C. for two hours. The resulting beads were filtered and dried with constant agitation. The resulting beads agglomerated and were not free-flowing.

Since pressure sensitive adhesives are typically considerably tackier and more compliant than neat polymers, the pelletizing aids and methods of pelletization that have been employed successfully in the polymer field have found limited utility in the field of pressure sensitive hot melt adhesives. Accordingly, there has been a long felt need for pelletized hot melt pressure sensitive adhesives and methods of producing such pellets.

SUMMARY OF THE INVENTION

The present applicants have found that the previously discussed prior art methods employed for making hot melt pressure sensitive beads and pellets are not amenable to producing a uniform continuous coating or to applying pelletizing aids at elevated concentrations. Further, these properties have been found to be important to insure the pellets are non-blocking and free-flowing under an array of storage conditions such as elevated temperatures and increased pressures.

The present invention discloses hot melt adhesive pellets and a method of pelletizing hot melt adhesives to produce pellets having substantially tack-free surface that are free-flowing and non-blocking. The method comprises the steps of: a) providing pieces of a thermoplastic composition ranging in size from about 3 mm to about 10 mm; and b) applying a substantially continuous coating of pelletizing aid to the exterior surface of said pieces. The pelletizing aid is either a component of the adhesive or a material which does not adversely affect the intended adhesive properties. The pelletizing aid is applied at a concentration ranging from about 1 wt-% to about 50 wt-%, preferably from about 2 wt-% to about 30 wt-%, and more preferably from about 3 wt-% to about 10 wt-%.

For adhesives that are applied by premelting the adhesive in a melt device, the pelletizing aid is preferably an adhesive component or a material compatible with the adhesive composition. However, for extrudeable grade HMPSAs, less compatible materials may be employed due to the active mixing of the pelletizing aid and the adhesive by the extruder.

The hot melt adhesive is preferably pressure sensitive having a storage modulus of less than about $5 \times 10^6$ dynes/cm$^2$, since it is typically unproblematic to pelletize non-pressure sensitive hot melt adhesives. The pelletizing aid is preferably a thermoplastic materials such as a thermoplastic polymer, tackifying resin, and mixtures thereof which may comprise small concentrations of wax as well as film-forming emulsions, dispersions, and suspensions (particularly those which are flexible). The pelletizing aid is more preferably a tackifying resin having a softening point greater than 100° C.

In another embodiment, the present invention is a method of making a hot melt adhesive pellet comprising the steps of providing a hot melt adhesive composition pieces ranging in size from about 3 mm to about 10 mm and coating the pieces with a pelletizing aid to form a continuous coating. The pelletizing aid and the concentration employed will be selected such that the intended adhesive properties as not adversely affected.

The pelletizing aid may be applied as an emulsion, solution or dispersion wherein the pellets are subsequently dried after application of the emulsion, solution or dispersion. For this embodiment, multiple applications of the pelletizing aid are preferably applied. Alternatively, the pelletizing aid may be applied molten or in powder form by means of magnetically assisted impact coating. Preferably, the pelletizing aid is applied by means of a two-step process by coating the pellet with a binder and powder forming a composite coating.

In another embodiment, the present invention is a method of pelletizing a hot melt adhesive composition comprising the steps of: a) selecting at least one ingredient for use as a pelletizing aid; b) preparing an adhesive composition precursor such that the concentration of an ingredient is changed by an amount to counterbalance the effect caused by the amount of pelletizing aid; c) forming said adhesive composition precursor into pieces having an exterior surface ranging in size from about 3 mm to about 10 mm; and d) applying said pelletizing aid to said exterior surface of said pieces. This embodiment is particularly useful when high concentrations of pelletizing aid are intended, for example in excess of about 10 wt-%.

DESCRIPTION OF THE DRAWINGS

FIG. 3 represents the one day storage conditions for Comparative B, pellets produced employing a wax emulsion as the pelletizing aid at a concentration of about 0.25 wt-%, whereas FIG. 4 depicts the one week storage conditions for Comparative B. FIG. 5 represents the one day storage conditions for Example 4, whereas FIG. 6 depicts the one week storage conditions.

DETAILED DESCRIPTION OF THE INVENTION

Figure 1:
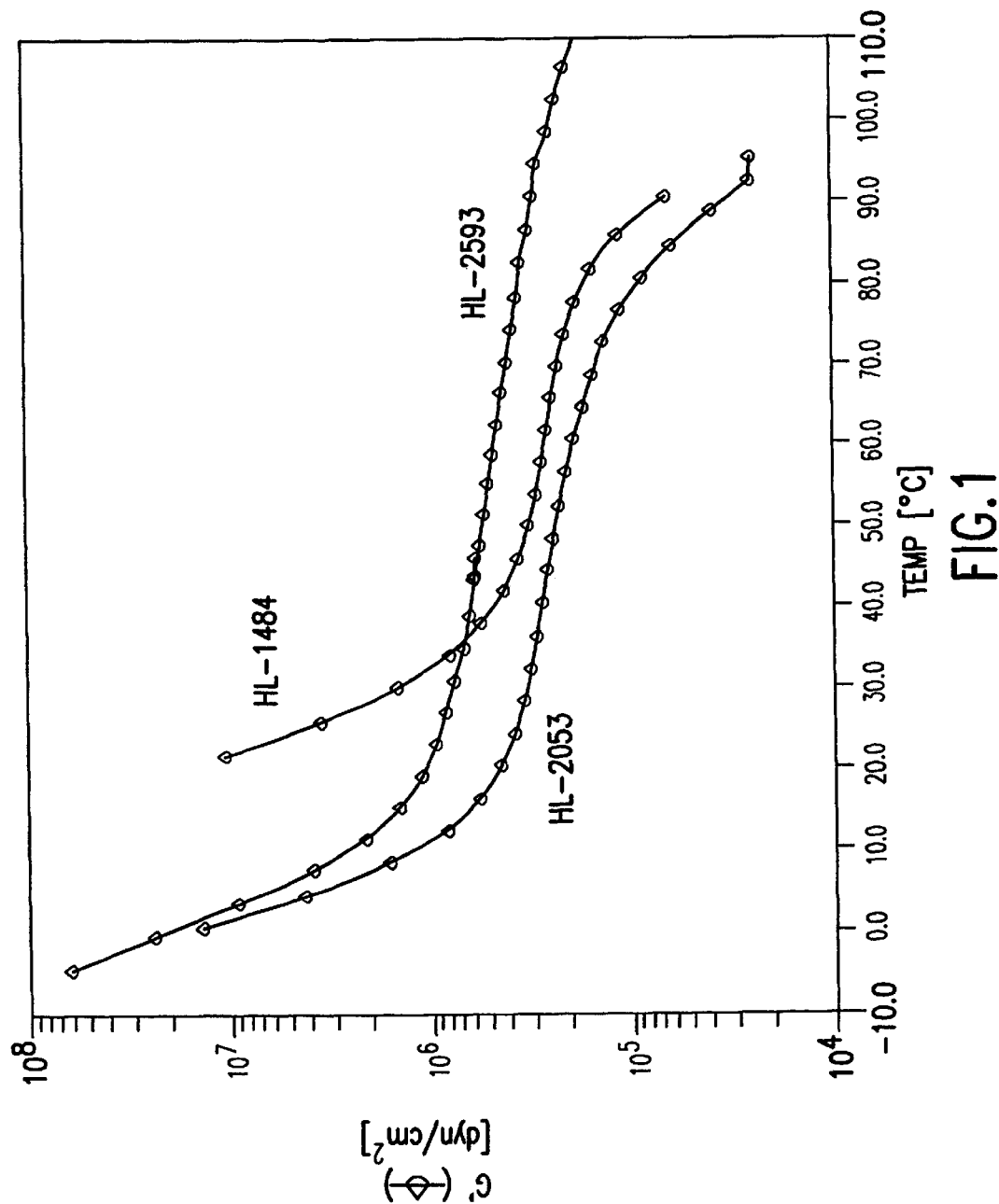
FIG. 1 is a temperature sweep of the storage modulus, (G') of certain adhesive compositions exemplified for use in the present invention.
Figure 2:
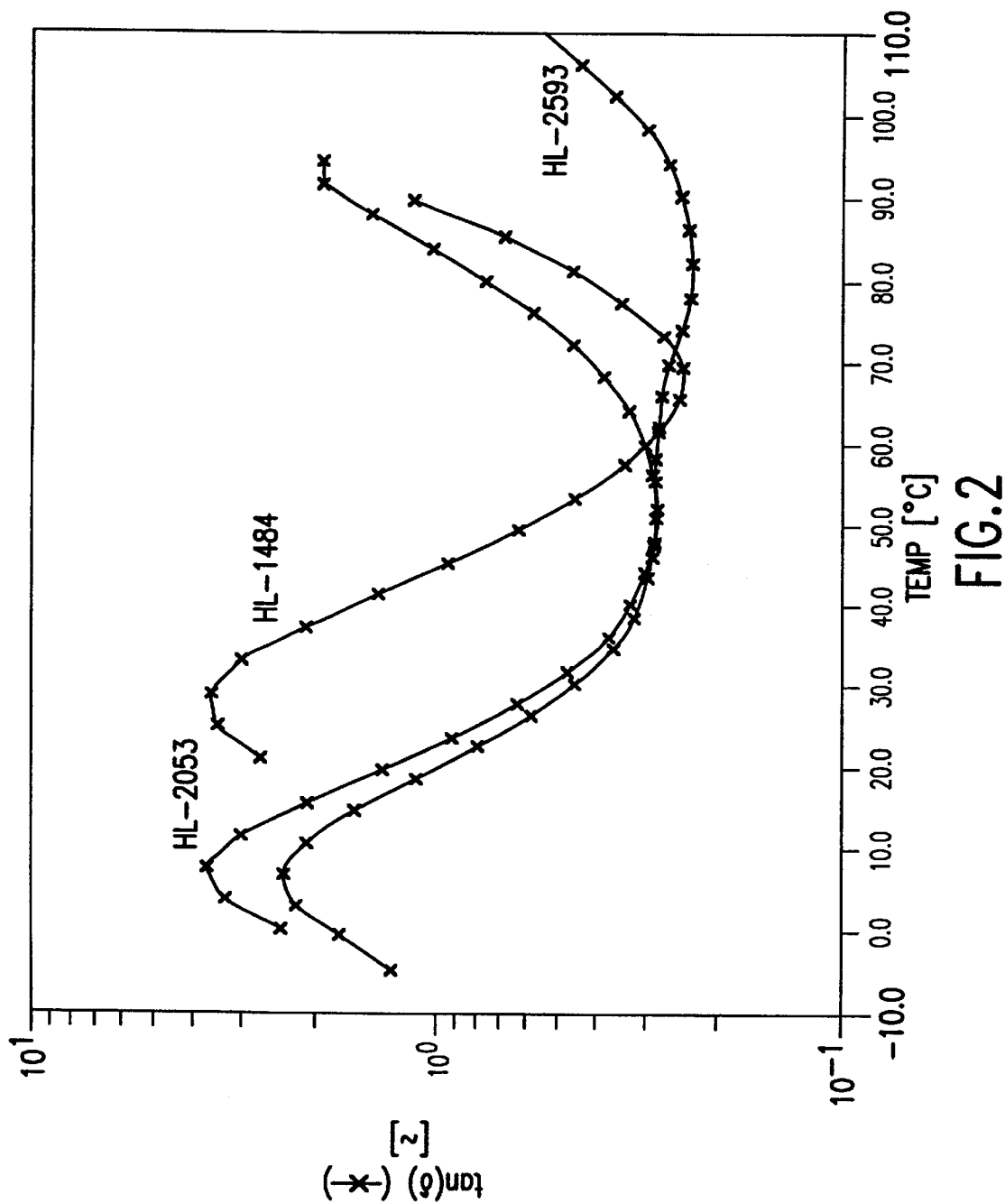
FIG. 2 depicts the tan delta (G'/G') for some of these exemplified adhesive compositions.
Figure 3:
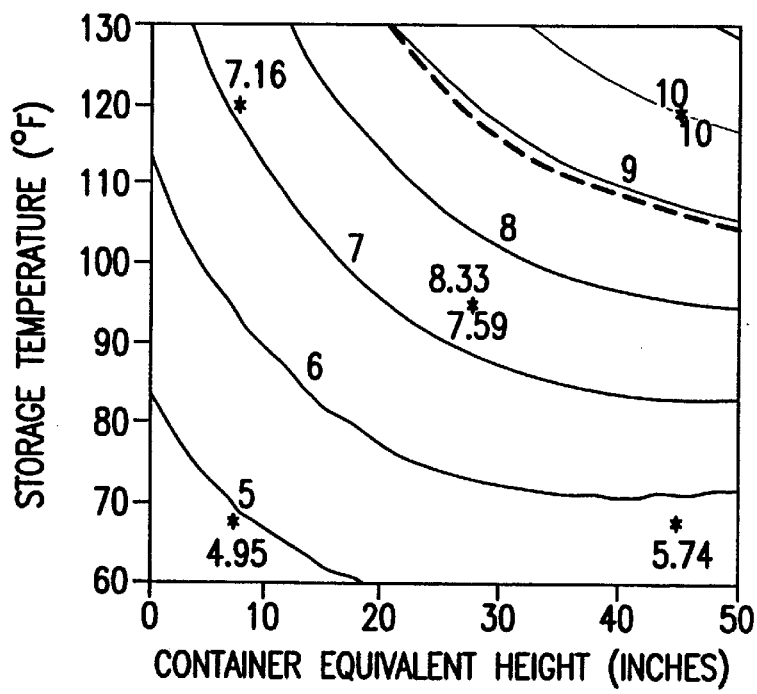
FIGS. 3, 4, 5, and 6 depicts the blocking resistance of pellets under a variety of storage conditions. The x-axis is the container height and the y-axis in the storage conditions. The asterisks points are actual data points which were fitted to a model with experimental design software. The contours represent the force required to remove a rod from the pellets as described in the blocking evaluation test method.
Figure 4:
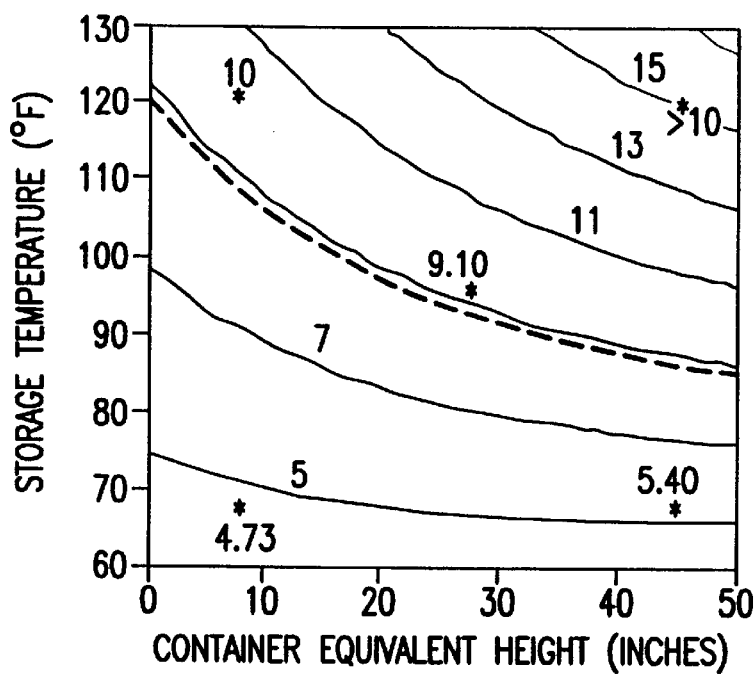
Figure 5:
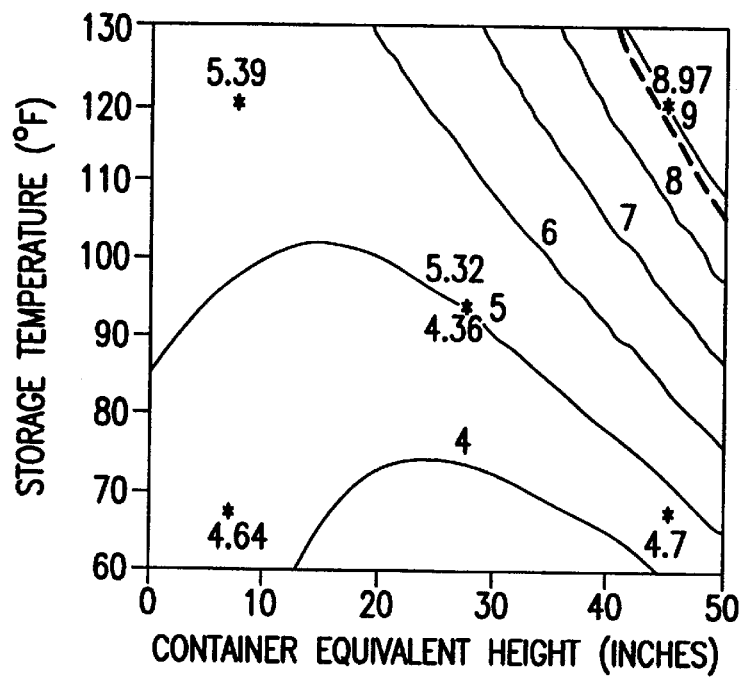
Figure 6:
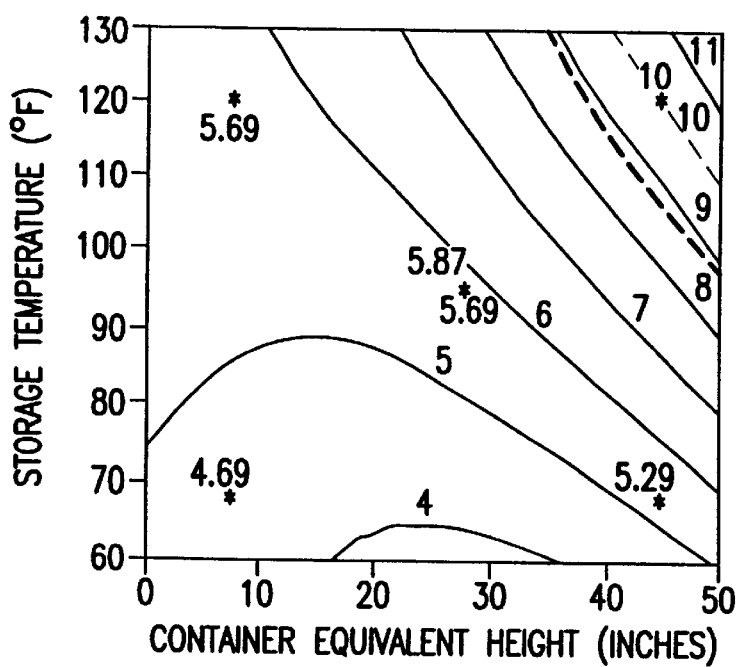

The present invention relates to hot melt adhesive pellets and methods of pelletizing hot melt adhesives to produce free-flowing pellets. By "free-flowing" or "non-blocking" it is meant that the force for removing a rod, as described in the "Blocking Evaluation" test method, is less than about 10 lbs. (4.5 kg) for a 4 lb. (1.8 kg) sample at 77° F. (25° C.) for 2 weeks. This sample size corresponds to an equivalent container height of a 10 inch (25.4 cm) box containing 8 –10 inches (20.3–25.4 cm) of pellet. For drums, the sample weight is increased to about 15 lbs. (6.8 kg) to correspond to a container height of 20–30 inches (50.8–76.2 cm), whereas for gaylords, a 20 lb. (9 kg) sample is employed which corresponds to a 40–50 inch (101.6–127.0 cm) container height. Preferably, the pellets are also non-blocking at higher temperatures. Thus, the removal force should be less than 10 lbs. (4.5 kg) after 2 weeks of storage at about 100° F. (38° C.), more preferably at about 120° F. (49° C.), even more preferably at about 130° F. (54° C.), most preferably at about 140° F. (60° C.). The non-blocking characteristics are surmised to be acceptable provided the hot melt pressure sensitive adhesive pellets exhibit a removal force about equal or less than a high vinyl acetate (44%) low MI (800) ethylene-vinyl acetate pellet under the same conditions.

The adhesive composition is preferably pressure sensitive since it has typically been less problematic to pelletize hot melt adhesive compositions which are not pressure sensitive in nature. Pressure sensitive adhesive compositions have a storage modulus, G', at 25° C. of less than about $5 \times 10^6$ dynes/cm$^2$, in accordance with the Dahlquist criteria. Depending on the composition, the pressure sensitive adhesive composition may have a storage modulus, G', at about 25° C., of less than $1 \times 10^6$ dynes/cm$^2$; for "softer" compositions, a G' of less than about $5 \times 10^5$ dynes/cm$^2$; for even "softer" compositions, a G' of less than about $1 \times 10^5$ dynes/cm$^2$; and for even softer compositions, a G' of less than about $5 \times 10^4$ dynes/cm$^2$. Further, the storage modulus is typically at least about $1 \times 10^4$ dynes/cm$^2$. In general, as the storage modulus (G') decreases and the compliance or relative "softness" of the adhesive composition increases, the composition is more difficult to form into non-blocking free-flowing pellets.

Further, it has been found that the storage modulus at elevated temperatures is predictive of the blocking tendencies at such temperatures. Although a variety of compositions may have about the same storage modulus, (G'), at 25° C., the slope of the storage modulus as the temperature increases from ambient temperature (25° C.) to elevated temperatures, for example 60° C., can differ significantly. The present applicants have found that the concentration of pelletizing aid to achieve a free-flowing, non-blocking pellet generally increases as the storage modulus decreases. Further, if the storage modulus decreases substantially at increased temperatures, even higher concentrations of pelletizing aid are preferred. Hence, to employ lower concentrations of pelletizing aid, less than about 10 wt-%, preferably the storage modulus (G') is at least about $1 \times 10^5$ dynes/cm$^2$ at 60° C.

The applicants have found that the cited methods previously employed for pelletizing hot melt adhesive are not amenable to applying pelletizing aids at sufficient concentration to improve blocking resistant during storage. The methods of the prior art rely solely on the tackiness of surface of the adhesive pellet to adhere the pelletizing aid to the adhesive surface. Particles of materials which prevent blocking, such as powdered wax, exhibit no tendency to adhere to each other. Hence, the thickness of the coating created by the pelletizing aid does not exceed the particle size (diameter) of the pelletizing aid particle. The theoretical maximum volume of pelletizing aid (assuming that the space between pelletizing aid particles is minimized) that can be adhered to the adhesive pellet surface can be calculated by subtracting the total volume of the coated pellet by the total volume of the interior adhesive portion. For a ¼" (0.6 cm) pellet sphere, (assuming a density of 1 for both the pellet interior and the pelletizing aid), the theoretical maximum ranges from 0.24 wt-% for a monodisperse 10 micron powder to 0.72 wt-% for a monodisperse 30 micron powder. In reality, the pelletizing aid particles adhere to the adhesive surface randomly, potentially forming gaps in between each particle. However, this effect appears to be counterbalanced by the fact that the powder is not truly monodisperse. In any event this model corresponds with actual experimental results. For example, when a 12.5 micron powder is used, the concentration of powder adhered to the surface was calculated to be 0.25 wt-% according to mass-balance calculations. In conclusion, by applying particulate pelletizing aid having a particle size up to 30 microns, it is not possible to adhere more than about 0.72 wt-% of pelletizing aid to a spherical tacky object ranging in size from 3 mm to 10 mm.

In contrast, the present invention employs methods which result in a continuous coating of pelletizing aid and which are amenable to applying higher concentrations of pelletizing aid. The pelletizing aid may be applied in a variety of forms including being applied molten; as a film-forming solution, dispersion, or emulsion; in the form of a powder, and preferably by a two-step method of applying thermoplastic binder and powder. Hence, the palletizing aid is applied to the pellet surface and either cooled and/or dried. The continuous coating thus formed is noncrosslinked and nonpolymerized as in the case of microencapsulation. In the case of powdered pelletizing aids, "continuous coating" means that the thickness of the pelletizing aid on the surface of the pellet is at least two particle depths and preferably from about 3 to 10 particle depths.

The pellets of the present invention comprise at least one pelletizing aid on the exterior surface of the hot melt adhesive pellets. For the purpose of the invention "pelletizing aid" will refer to any material that is applied and retained on the hot melt adhesive pellet surface. The pelletizing aid substantially surrounds the tacky composition such that the pellets are non-blocking and have a substantially tack-free surface. Hence, the pelletizing aid itself is non-blocking, meaning that the storage modulus, G', of the pelletizing aid is greater than $1 \times 10^7$ dynes/cm$^2$ and preferably greater than $1 \times 10^8$ dynes/cm$^2$ throughout the temperature range of interest. (25° C. to 120° C./140° C.) Once the pellets are melted and resolidified, the compositions once again attain their original tacky state.

The pelletizing aid may be any single material or compounded material which forms a substantially tack-free surface on the pellet, yet does not adversely affect the pressure sensitive adhesive properties. Accordingly, the pelletizing aid is either a component, mixture of components of the adhesive or an ingredient(s) compatible with the adhesive composition. Preferably, the pelletizing aid is thermoplastic and an ingredient the adhesive is comprised of such as a thermoplastic polymers, tackifying resins, and mixtures thereof. Additionally, the pelletizing aid may be, or further comprise, a wax, if limited to concentrations of less than about 10 wt-%, preferably less than about 5 wt-%, and most preferably in amounts ranging from about 0.1 wt-% to about 3 wt-%.

In some embodiments the adhesive composition is surrounded by a pelletizing aid wherein the pelletizing aid is not intended to serve any other purpose other than to provide a tack-free surface. The effects of the pelletizing aid can be measured by comparing the properties of the unpelletized adhesive composition to the properties of the pelletized adhesive composition. For this embodiment, the pelletizing aid shall not unintentionally detrimentally affect the critical adhesive properties. Detrimental affects are characterized as a molten viscosity change of greater than about 30%. Preferably, the viscosity of the adhesive will change by less than about 20%, more preferably less than about 10%. The loop tack values and peel values (typically 180° peels to stainless steel) also preferably change by less than about 30%, preferably less than about 20%, and most preferably less than about 10% of the value. Differences of less than about 5–10% cannot typically be detected with current test methods and equipment. These properties are not only tested initially, but are also aged and retested over time. For instance, the viscosity may be tested over a 100 hour period, every 24 hours, using adhesive without pelletizing aid as the standard for embodiments wherein the pelletizing aid is not an ingredient(s) of the adhesive. The loop tack values and peel values may be tested over a one-week or two-week period with the values not decreasing by more than about 20% over the course of aging. It is most preferable that the pelletizing aid have no affect whatsoever on the adhesive properties.

In other embodiments, the pelletizing aid may be an intended ingredient of the adhesive composition. For example when a tackifying resin is employed as the pelletizing aid at a concentration of about 15 wt-% or higher, the thermoplastic composition on the interior of the pellet is chosen such that the mixture of the interior composition and the pelletizing aid will produce the desired adhesive characteristics. In this embodiment the composition being pelletized may is an adhesive composition precursor which does not have the intended desired properties until admixed with the pelletizing aid. Hence, for these types of embodiments, it is not appropriate to make the previously described comparison.

For hot melt adhesive compositions applied at temperatures above 160° C., the preferred pelletizing aids are solid thermoplastic materials, becoming molten at a temperature of less than about 180° C., more preferably at a temperature of less than about 160° C. For low application temperature applied HMPSA's, the pelletizing aid preferably becomes molten at less than 140° C., more preferably at a temperature of less than about 120° C., and even more preferably at a temperature of less than 100° C. If the melting point is too low, the pellets will not be prevented from blocking together. If the melting point is too high, the outside coating will not sufficiently melt and may cause blocking of nozzles in the application equipment. Additionally, the pelletizing aid preferably exhibits a molten viscosity at the application temperature of the adhesive similar to that of the adhesive composition.

The pelletizing aid insures that the pellets are non-blocking at ambient temperature (25° C.) preferably non-blocking at about 100° F. (38° C.), more preferably non-blocking at 120° F. (49° C.), even more preferably non-blocking at 130° F. (54° C.), and most preferably non-blocking at temperatures of about 140° F. (60° C.). Hence, in addition to the desired melt point, the pelletizing aid itself is free-flowing and non-blocking.

The amount of pelletizing aid employed ranges from about 1.0 wt-% to about 30 wt-% by weight of the adhesive composition, more preferably from about 2 wt-% to about 20 wt-% by weight of the composition and most preferably from about 2 wt-% to about 10% by weight of the composition. As the storage modulus of the adhesive composition decreases, the amount of pelletizing aid required to obtain free-flowing pellets increases to an amount of about 3 wt-% to about 30 wt-% and preferably from about 4 wt-% to about 10 wt-%.

Additionally, the concentration of pelletizing aid is related to the composition of the pelletizing aid. As previously discussed, in the case of waxes, the pelletizing aid concentration is minimized to a concentration of about 0.1 wt-% to about 10 wt-%, preferably from about 0.1 wt-% to about 5 wt-%, and most preferably from about 0.1 wt-% to about 3 wt-% in order that the adhesive composition is not adversely affected. Further, it is preferable to employ a wax that does not contain polar constituents, to minimize blooming effects. Preferred waxes are highly crystalline having a 40° C. to 80° melt point such as certain paraffin waxes. However, in the case of tackifying resins, significantly higher concentrations may be employed, particularly when the hot melt adhesive composition is prepared excluding an amount of tackifying resin about equal to the amount intended to be applied to the outer surface of the pellet.

Adhesive compositions typically comprise at least about 10% by weight of a tackifying resin, as it is the tackifying resin that generally provides the majority of the adhesion. Accordingly, tackifying resins may be employed as pelletizing aids in amounts conceivably up to the concentration contained in the adhesive composition, or in other words, as high as about 50% to 65% by weight of the composition, wherein the remaining ingredients, i.e., the thermoplastic polymer and/or plasticizer and/or liquid resin, remain in the inside portion of the pellet. For such embodiments, it is surmised that the adhesive will be applied with an extruder rather than conventional hot melt application equipment, as active mixing is surmised to be necessary.

In the absence of being compounded with a polymer, the amount of is tackifying resin which can be retained on the exterior surface of the pellet is believed to be somewhat lower, about 30 wt-%, since tackifying resins in general have a high Tg causing them to be friable at ambient temperature (25° C.), increasing the likelihood of the resin fracturing off the pellet core. Hence, tackifying resins are useful at a much broader concentration range than a wax.

High softening point tackifying resins are preferred pelletizing aids. Further, if relatively high concentrations are intended, for example greater than about 10 wt-%, it is preferred that the tackifying resin be primarily aliphatic, such as those compatible with the mid-block in the case of block copolymer based adhesive compositions. If employed alone, uncompounded with polymer, the tackifying resin preferably has a softening point of greater than about 100° C., preferably greater than about 120° C., more preferably greater than about 130° C. and most preferably greater than about 140° C. If the tackifying resin is predominantly aromatic, being primarily compatible with the end-block of a block copolymer, preferred tackifying resin concentrations range from about 2 wt-% to less than 25 wt-%, preferably less than about 20 wt-%. However, in the case of mid-block tackifying resins the concentration employed as the pelletizing aid may be substantially higher, provided the amount of tackifying resin employed during the preparation of the adhesive composition is reduced by an amount about equal to the amount intended to be applied to the exterior surface of the pellet as the pelletizing aid.

Particularly for extrudeable grade hot melt adhesives, various thermoplastic polymers are surmised to be useful as a pelletizing aid. Preferred are the previously described polymers employed as base polymer(s) in the hot melt adhesive compositions and the previously described thermoplastic polymers that are known to be compatible with, but are too crystalline to serve the function as the base polymer. Other polymers which are less common HMPSA composition ingredients that are surmised to be useful as pelletizing aids are water sensitive thermoplastic polymers, particularly the water soluble polyamides described in Fagerburg, U.S. Pat. No. 3,882,090 issued May 6, 1975 and blocked polyurethanes having either an ester or ether backbone exemplified in U.S. Pat. No. 4,594,286 to McKinney et al. issued Jun. 19, 1986, incorporated herein by reference; polyamides, polyesters, polyacrylics, and mixtures thereof. Microencapsulated liquids such as oils, liquid tackifying resins, and liquid polymers are also surmised to be suitable pelletizing aids for extrudeable grade hot melts.

In the case of powdered pelletizing aids, preferred are powders which do not contain particles greater than 60 microns. More preferred, are powders having a mean particle size from about 0.5 micron to about 30 microns, more preferably from about 1 micron to 20 microns, and most preferably from about 5 microns to about 30 microns. If the particle size is too large, the pelletizing aid does not uniformly coat the pellet. Since large particle size powders are to be avoided, it is also preferable that the powder be relatively monodisperse with regard to particle size. The desired particle size of the powder may be achieved by grinding. Further, if a mixture of powders is employed, it is preferable that each powder comprising the mixture has about the same particle size.

Aqueous dispersions, emulsions, and solutions of water soluble/dispersible polymers and/or tackifiers, and/or waxes may be employed as pelletizing aids in the present invention. Particularly preferred are film-forming compositions that have a contact angle greater than 110°, and more preferably greater than 120° with respect to the adhesive composition interior. Film-forming solutions, emulsions and dispersions are generally those which comprise copolymers having a Tg less than about 20° C. At a Tg (glass transition temperature) greater than 20° C., the polymer typically will not coalesce. There are, however, a few exceptions to this generality such as vinyl acetate homopolymers, neoprene, and butyl acrylate which have a higher Tg yet are film-forming. It is also preferable, that such polymers be thermoplastic, miscible with the hot melt adhesive at the intended application temperature, and plasticizer resistant particularly oil-resistant. Non-thermoplastic polymers would not melt and may cause problems in industrial hot melt application equipment in that nozzles and lines may be clogged and production brought to a halt.

Dispersible polymers include polyurethanes (PUDS), polyamides, natural latexes, and synthetic emulsion polymers. Synthetic emulsion polymers are produced from monomers such as acrylics, vinyls, vinyl aromatics, αβ-unsaturated carboxylic acids and their esters. A non-inclusive list of suitable examples include monomers such as acrylic and methacrylic acid esters, ethylene, propylene, butylene, isobutylene, hexene, vinyl acetate, vinyl esters of versatic acids, vinyl chloride, acrylonitrile, acrylamide, vinylidene chloride, oleic acid, linoleic acid, 1,3-butadiene, isoprene, norbornene, cyclopentadiene, itaconic acid, crotonic acid, maleic acid, fumaric acid, styrene, α-methyl styrene, vinyl toluene and the like. These monomers can be used as homopolymers, but are typically copolymers employing standard emulsion polymerization techniques to produce the dispersions used in this invention. These emulsion can be firther modified in properties such as particle size, molecular weight and surface tension to further effect the performance of these latexes. These suspensions are typically 50 wt-% water and 50 wt-% of the polymer. However, the solids content of the emulsions and dispersions can be varied to control the concentration of pelletizing aid that may be applied with a single application.

Particularly preferred are solutions, emulsions, and dispersions that will form a film will stretch and deform with the adhesive pellet when subjected to pressure. The elongation of the pelletization aid film is desirably 100% to about 500%. Commercial examples include vinyl emulsions such as FULLATEX PD-2044, available from H. B. Fuller Company, St. Paul, Minn.

In embodiments wherein the film-forming emulsion, dispersion, or solution is the only material coated on the exterior of the pellet, multiple applications are typically required to attain a sufficient thickness of pelletizing aid.

In embodiments wherein the adhesive composition is water dispersible or water soluble, pelletizing aids in the form of an aqueous dispersion, emulsion, or solution that would appreciably dissolve the adhesive composition are avoided. However, a minimal controlled amount of dissolution is perceived to be desirable and could conceivably serve as the "binder" in the preferred two-step process. Rather than contacting the adhesive pellet with a binder, the adhesive pellet would be contacted with a fluid which would dissolve the adhesive pellet on the surface creating an in-situ binder. In most instances when employing the preferred two-step process, the exposure time to the aqueous based binder will be sufficiently short enough such that the adhesive would not have the opportunity to appreciably dissolve. Alternatively, the characteristics of the emulsions, dispersions, and solutions can be chosen to minimize dispersibility. For example, since the Eastman AQ copolyesters are saline insoluble, saline based binders, solution, emulsions, and cooling fluids could successfully be employed. Alternatively in the case of alkaline soluble thermoplastics, acid based binders, solution, emulsions, and cooling fluids are surmised to be useful.

Provided that the pelletizing aid serves its intended purpose of ensuring the pellets are non-blocking without adversely affecting the adhesive performance, the type of pelletizing aid and the process used to apply the material is largely determined by economics. In general, the more steps which are required, the more costly the manufacturing becomes. Therefore, the least number of steps which will result in a sufficient thickness and/or concentration of pelletizing aid are preferred.

HMPSAs can be formed into pellets using known underwater pelletization techniques. The water is preferably chilled to temporarily detackify the adhesive. The extent of cooling necessary to detackify each thermoplastic composition is a function of the rheological properties of the thermoplastic composition to be packaged. The pellet is cooled to a temperature at which the shear storage modulus of the hot melt adhesive composition is at least about $1 \times 10^7$ dynes/cm$^2$ and preferably about $1 \times 10^8$ dynes/cm$^2$ and greater. Depending on the adhesive composition being palletized this temperature may range from about −45° C. to 10° C. When sub-zero (° C.) temperature are required the cooling medium shall be any liquid, gas or solution capable of maintaining such temperatures without undergoing a phase change. Liquid or gaseous nitrogen, compressed carbon dioxide and the like are suitable coolants for this purpose. Preferably, the cooling medium is provided as a refrigerant bath such as chilled glycol, and aqueous electrolyte solutions wherein the freezing point is sufficiently depressed below the temperature at which the pellet composition is to be cooled to.

The pellets can be made into any convenient size. Preferably, the pellets are substantially spherical, with sizes ranging from about ⅛ inch to about ⅜ inch (about 3 mm to about 10 mm) in diameter for easy handling. The pellets can also be ellipsoidal and cylindrical. The preferred dimensions for these shapes can range from about 3 mm to about 10 mm diameter spheres to 10 mm base by 20 mm height cylindrical pellets.

Preferred methods are those which conveniently and economically uniformly distribute a continuous coating of pelletizing aid onto a tacky material at concentrations greater than 1.0 wt-%. This may be achieved with a film-forming solutions, emulsions, and dispersions alone with multiple application and drying steps, by applying the pelletizing aid molten, by magnetically assisted impact coating processes, and with two-step methods of applying a binder and powder.

For embodiments wherein the pelletizing aid is provided in an aqueous form, the emulsion, dispersion, or solution can be added to the water in a underwater pelletizing process. Hence the pelletizing aid is applied to the pellets and the pellets cooled simultaneously. Alternatively, the pelletizing aid may also be sprayed onto the pellet after it emerges from the cooling medium.

Alternatively molten pelletizing aid may be sprayed onto the pellets or the pellets immersed in molten pelletizing aid. If molten, it is preferred to maintain the temperature of the pelletizing aid as low as possible and preferably slightly above or less than the melting point of the finished adhesive. If it is necessary that the temperature of the molten pelletizing aid be higher to reduce the viscosity of the pelletizing aid and hence, improve the processability, the amount of time the adhesive pellets contacts the molten pelletizing aid must be minimized to prevent excessive melting of the adhesive pellet. Alternatively, to minimize melting of the adhesive it is preferred to cool the adhesive pellet portion to sub-zero (°C.) temperatures prior to applying the molten pelletizing aid. Applying the pelletizing aid molten or multiple applications of aqueous forms of pelletizing aid is amenable to higher concentration of pelletizing aid on the pellet surface, necessary to produce non-blocking pellets from low modulus hot melt pressure sensitive adhesives.

In yet another embodiment, the pelletizing aid is applied in particulate or powdered form by means of spray drying, prilling or magnetically assisted impart coating processes. The powder coated pellet can be subsequently heated to melt and fuse the powder on the pellet surface. In the case of spray drying or prilling, the adhesive core to be coated is added to the melt or solution and during atomization the coating is done. In the case of Magnetically Assisted Impact Coating (MAIC), available by Aveka Inc. (Woodbury, Minn.), the adhesive core is coated with the pelletizing aid by means of a peening process. By adding a small coating particle onto a large particle core into an assembly of small oscillating magnets, the small particles are readily coated onto the core particles.

The two-step method comprises first contacting a particulate tacky material with a thermoplastic binder to form a coating of binder directly adhered onto the tacky material particles. Then, contacting the binder-coated tacky material particles with a powder to form a composite coating of the powder and binder directly adhered onto the surfaces of the tacky material particles creating a continuous composite coating that includes the binder and the powder.

More specifically, tacky material particles are first coated with the binder (usually in liquid form), for instance by first tumbling the two ingredients in a drum, and second, a coating of powder is applied, such as by sprinkling dry powder onto the coated mixture (which is wet if the binder was in liquid form) in the drum, while still tumbling. (Large drums that slowly rotate are commercially available, and include an inlet for air, if desired, to be forced into the drum.) Upon addition of the powder, the resultant mixture quickly (usually within a few seconds) becomes discrete particles coated with the binder and powder composite. The resultant mixture, even if still damp, exhibits no tendency for the coated particles to stick together.

The resultant is then removed from the drum, and, if the binder and/or powder is with a solvent (such as in aqueous form with water) and is thus wet, as further described below, the resultant is allowed to dry, typically by spreading it out on a screen and leaving it to dry for about 0.25 to 3 hours so that the solvent evaporates. Longer drying times may be employed with large amounts (i.e., hundreds of kilograms) of tacky material, binder, and powder. The drying can simply be air drying at standard room temperature of about 72° F. (22° C.), but can be at ambient temperatures, including with heat, such as at about 80° F. (27° C.) to about 100° F. (38° C.), or even higher. Higher temperatures will lessen the drying time. Alternatively, the drying may be achieved by continuing to tumble the particles by rotating the drum, optionally with forcing air into the drum to achieve quicker drying.

As noted, the contacting with binder and then with powder is advantageously accomplished in a rotating drum, to help create uniform distribution of the binder and the powder. The rotation should be for a time sufficient to achieve uniform coating with the powder incorporated into the binder, and typically the drum is rotated from about 2 seconds to about 20 minutes, more typically about 0.1 to about 10 minutes, and even more typically about 0.5 to about 5 minutes, per coating. Of course, on a factory scale with large amounts (i.e., hundreds of kilograms) of tacky material, binder, and powder, the rotating may be longer (¼ to ½ hour, or even longer) to help achieve uniform coating. A suitable time can be readily determined by the person of ordinary skill in the art without undue experimentation.

The powder employed in the two-step process may be polymeric or non-polymeric and is preferably the previously described pelletizing aids provided in a powder form.

For extrusion grade hot melt adhesives compositions, non-polymeric materials may be suitable due to the active mixing of the pelletizing aid (binder and powder) with the tacky adhesive. Suitable non-polymeric materials include particulate clay, talc, silica, metal silicate, or metal salt of an organic acid (such as metal stearates including zinc stearate, calcium stearate, and aluminum stearate). Use of such materials for the powder depends on whether the intended end use of the non-tacky resultant composition will tolerate such materials, which typically do not melt under certain typical heat conditions of certain end uses. Preferably, the binder and powder are thermoplastic materials that are extrudable, to insure it will not cause problems in the extruder (i.e., screw slippage or smoking) and will not cause problems in the end plastic product (i.e., pin holes when the end product is a plastic film).

Additionally, this two-step method provides a convenient means of coating an additive onto an adhesive pellet. Additives include such materials as antioxidants, pigments, flame retardants, intumescents, antimicrobials, as well as endothermic and exothermic chemical blowing agents. Thus, such material may serve as a dual purpose pelletizing aid. The use of chemical blowing agents is surmised to have particular utility for foam in place gaskets.

The binder may be in the form of a solution, emulsion, or dispersion in a solvent, such as water, alcohol, or hydrocarbons. Binders in the form of dry powders may be employed by admixing with water and/or other solvents. Suitable solutions, emulsions (such as a wax emulsion), or dispersions are about 1% to about 65% by weight solids, more preferably about 30% to about 50% by weight solids, with the remainder being solvent.

Examples of binders useful in the present invention include, but are not limited to, a vinyl acetate homopolymer, a polyurethane, a polyacrylate, an alkyd, a polyvinyl alcohol, a salt of an acid polymer, a polyurea, a polycarbonate, a polysilicate, and combinations thereof. Preferred are ethylene acrylic acid binders such as Michelman 4990R and 4983R available from Michelman Inc., Cincinnati, Ohio and binders comprising multi-melt point components such as Calzin. Polyvinyl alcohol and salts of acid polymers (such as salts of polyacrylic acids), if employed as the binder, should be employed in aqueous form.

More preferably, the binder is a film former meaning that the binder will evenly coated the HMPSA pellet and once dried forms a substantially continuous film. Accordingly, the binder preferably has a contact angle of greater than 110°, and more preferably, greater than 120° with respect to a film of the HMPSA to be coated.

A suitable binder is the polyvinyl acetate/ethylene vinyl acetate emulsion available from The Reynolds Company under the trade name REYNCO 8633, which is a water based wax emulsion. The Reynolds Company also sells an aqueous emulsion under the trade name REYNCO 6933.

A suitable vinyl acrylic copolymer for the binder is available as an emulsion under the trade name FULLATEX PD-0110 and PD-0124, available from H. B. Fuller Company and ROVACE 661 available from Rohm and Haas Company of Philadelphia, Penn. ROVACE 661 is about 55% by weight of vinyl acetate homopolymer in water, has a pH of about 4.5 to 5.0, and a viscosity of about 600 to 1500 centipoise at 20 rpm and 25° C. on a Brookfield RV spindle #3.

The ratio of the tacky material particles, the binder, and the powder should fall within certain ranges to yield a free-flowing, non-tacky composition. There should be a sufficient amount of the binder to cover the surface area of the tacky material particles with a thin film of the binder. The binder-covered particles are then treated with sufficient powder readily to convert the mixture to non-tacky, free-flowing, continuously coated particles.

More particularly, it is preferred that the amount of binder be about 30 to 50, more preferably about 40, parts by weight per about 100 parts by weight of the powder employed. In other words, if about 10 parts by weight of powder as compared to about 100 parts by weight tacky material is employed, then about 4 parts by weight of the binder is employed, whereby the resultant final product of tacky material, binder, and powder contains about 2% by weight of the binder. It is noted that at least about 1 part by weight of powder and about 0.4 parts by weight of binder per about 100 parts by weight of tacky material particles should be employed to achieve continuously coated particles having a sufficient amount of powder so that the resultant is effective in its desired end use.

It has been found that for a single pass coating of powder onto tacky material particles already having binder, up to about 10 parts by weight of the powder per about 100 parts by weight of tacky material can be employed without the powder dusting off from the resultant.

Suitable ratios of binder and powder can be readily ascertained by the person of ordinary skill in the art without undue experimentation by simply stirring a small amount, perhaps one third cup, of tacky material pellets in a paper cup with, for instance, sufficient water-based binder to yield a thin continuous film over the surface of all the pellets. While still stirring the wetted pellets, a portion of powder of known weight is slowly added over 5 to 10 seconds until the pellets become coated and are damp but free-flowing. The remaining powder may be weighed to determine the amount of dry powder utilized. Suitable ratios are quite broad and acceptable resultant non-tacky material can be produced over a moderate range of combinations. When desired, the thickness of the composition can be varied considerably by using larger or smaller ratios of binder and powder to the tacky material pellets.

Also, the process of adding the binder and then the powder can be repeated so that tacky material particles already coated can be coated again with binder and powder up to about 20 parts by weight, about 40 parts by weight, about 60 parts by weight, or even higher of powder to about 100 parts by weight of tacky material particles. Accordingly, different powders can be added incrementally to the same tacky material particles. For instance, tacky material particles can first be coated with polyethylene powder as the powder, aird then coated with talc as the powder, if that is suitable for the desired end use.

The smaller the tacky material particles are, then the higher will be the surface to volume ratio of the particles. For instance, if the particle is assumed to be spherical, and the coating of powder is considered to be uniform, then the volumetric ratio of coating to particle is approximately 3 times the coating thickness divided by the radius of the sphere for thin coatings. Therefore, if the particle radius is 0.06 inch (0.15 cm), then for a coating thickness of 0.002 inch (0.005 cm), a 10% volumetric ratio of powder to particle will be achieved. On the other hand, if the particle radius is 0.03 inch (0.08 cm), the same 0.002 inch (0.005 cm) thickness of powder coating will yield a 20% by volume of powder to particle. Consequently, higher loadings of powder can be achieved with smaller particles for a given coating thickness.

In the method for contacting the tacky material particles with binder and then contacting the binder-coated particles with powder, there is no need for adding heat or pressure during formation of the composition. However, heat or pressure may be employed to alter adhesive characteristics. Moreover, the method may be carried out in the ambient atmosphere since there is no need, for instance, for a blanket of nitrogen gas. Preferably, the method is carried out in the cold at about 40° F. (4° C.). Usually temperatures below 50° F. (10° C.) are suitable.

The pressure sensitive adhesive compositions of the present invention typically comprise at least one thermoplastic polymer, at least one tackifying resin, and a plasticizing oil. However, if a liquid tackifying resin is employed or the thermoplastic polymer component has a relatively low storage modulus, the composition may consist entirely of polymer(s) and tackifying resin(s).

The thermoplastic polymers for use in the present invention include block copolymers; homopolymers, copolymers and terpolymers of $C_2$–$C_8$ alphaolefins; homogeneous ethylene-alpha-olefin interpolymers and styrenic, vinylic and grafted versions thereof; as well as certain polyamides and polyesters, particularly those which are water dispersible or water soluble. The $C_2$–$C_8$ alphaolefin based polymers generally have a relatively low density, less than about 0.900 g/cm$^3$, preferably less than about 0.890 g/Cm$^3$, and more preferably less than about 0.880 g/cm$^3$. Higher density polymers are typically too crystalline to serve as the base polymer for a pressure sensitive adhesive composition.

The concentration of thermoplastic polymer employed in the invention ranges from about 5 wt-% to as much as 90 wt-% and depends primarily on the molecular weight (Mw) which relates to the melt index (MI) and/or solution viscosity of the thermoplastic polymer(s) utilized. For extrudable grade adhesives, the thermoplastic polymer typically ranges from about 10 wt-% to about 70 wt-%, more preferably from about 10 wt-% to about 60 wt-% and most preferably from about 20 wt-% to about 60 wt-% in the adhesive. In contrast, hot melt adhesives which are typically applied by slot-coating, spiral spraying, melt-blowing, engraved roller and other traditional application techniques tend to be lower in viscosity. Accordingly, such adhesive compositions are typically comprised of lower polymer concentrations ranging from about 10 wt-% to about 50 wt-%, preferably from about 10 wt-% to about 40 wt-%, and more preferably from about 10 wt-% to about 30 wt-%.

Relatively high molecular weight polymers, those having a molecular weight of greater than about 200,000 g/mole, are typically employed at concentrations ranging from about 2 wt-% to about 30 wt-%, and preferably from about 5 wt-% to about 20 wt-%. In contrast, lower molecular weight polymers, those having a melt index of about 200 g/10 min. or greater, may be employed at higher concentrations.

A wide variety of block copolymers are useful in the present invention including A-B-A triblock structures, A-B diblock structures, (A-B)$_n$ radial block copolymer structures, as well as branched and grafted versions of such, wherein the A endblock is a non-elastomeric polymer block, typically comprising polystyrene and/or vinyl, and the B block is an unsaturated conjugated diene or hydrogenated version thereof. In general, the B block is typically isoprene, butadiene, ethylene/butylene (hydrogenated butadiene), ethylene/propylene (hydrogenated isoprene), and mixtures thereof.

In general, block copolymers range in A block (styrene or vinyl) content from 0, as in the case of multi-arm (EP)n$^8$ 100% diblock polymers to about 50wt-%. Typically, the non-elastomeric A block concentration ranges from about 10 wt-% to about 45 wt-% with respect to the weight of the block copolymer. Block copolymers also range in diblock contents from 0, wherein the block copolymer is 100% coupled, to 100% diblock, as previously mentioned. Further, the molecular weight of block copolymer is related to the solution viscosity at 77° F. (25° C.) of a given weight of polymer in toluene. The amount of block copolymer employed for determining the solution viscosity depends on the molecular weight. For relatively high molecular weight block copolymers, the solution viscosity is typically expressed as a function of a 10 wt-% block copolymer solution, whereas for more conventional and lower molecular weight block copolymers, a 25 wt-% block copolymer solution is employed. A preferred high molecular weight block copolymer is a substantially saturated A-B-A block copolymer, wherein the A block is polystyrene or vinyl and the B block is ethylene-butylene, ethylene-propylene or mixtures thereof, such as Kraton™ G-1651.

The preferred diblock content of the block copolymer depends on the intended adhesive attributes. For cohesively failing adhesives or when it is desired to employ a high concentration of thermoplastic polymer, relatively high diblock contents are desired. However, the majority of block copolymer based pressure sensitive adhesives employ block copolymers having a relatively low diblock content, less than 50 wt-% diblock with respect to the weight of the block copolymer.

Commercial embodiments include the Kraton® D and G series block copolymers, available from Shell Chemical Company (Houston, Tex.), Europrene® Sol T block copolymers available from EniChem (Houston, Tex.), Vector® block copolymers available from Exxon (Dexco) (Houston, Tex.), as well as others. Branched versions such as Kraton® TKG-101 having a styrene-ethylene/butylene-styrene backbone with isoprene side chains as well Kraton® G-1730, an S-EP-S-EP block copolymer having a terminal ethylene-propylene block rather than terminal polystyrene, are also useful for increasing tack.

Amorphous polyolefins or amorphous polyalphaolefins (APAO) are homopolymers, copolymers, and terpolymers of $C_2$–$C_8$ alphaolefins. These materials as typically polymerized by means of processes which employ Ziegler-Natta and peroxide catalysts result in a relatively broad molecular weight distribution. Commercially available amorphous polyalphaolefins include Rextac® and REXFlex® propylene based homopolymers, ethylene-propylene copolymers and butene-propylene copolymers available from Rexene (Dallas, Tex.) as well as Vestoplast® alpha-olefin copolymers available from Hüls (Piscataway, N.J).

Metallocene polyolefins are homogeneous linear and substantially linear ethylene polymers prepared using single-site or metallocene catalysts. Homogeneous ethylene/α-olefin interpolymers differ from amorphous polyolefins also described as amorphous polyalphaolefins (APAO), with regard to homogeneity, molecular weight distribution ($M_w$/$M_n$), as well as comonomer (α-olefin) content. Amorphous polyolefins are homopolymers, copolymers, and terpolymers of $C_2$–$C_8$ α-olefins which are typically polymerized by means of processes which employ Ziegler-Natta catalysts, resulting in a relatively broad molecular weight distribution, typically greater than 4. In contrast, the homogeneous ethylene/α-olefin interpolymers are characterized as having a narrow molecular weight distribution. The homogeneous ethylene/α-olefins have a $M_w$/$M_n$ of less than 4, preferably less than 3, more preferably from 1.5 to 2.5, even more preferably from 1.8 to 2.2, and most preferably about 2.0. Further, whereas amorphous polyolefins produced from Ziegler-Natta catalysis typically have an α-olefin concentration greater than 50 wt-%, homogeneous ethylene/α-olefin interpolymers useful in the present invention are predominantly ethylene, having a greater ethylene content than comonomer content.

Additionally, or in the alternative, the adhesive composition of the present invention may comprise an amorphous water sensitive thermoplastic polymer. One particularly preferred class of amorphous water sensitive thermoplastic polymers is water dispersible copolyesters available from Eastman Chemical Company (Kingsport, Tenn.) under the tradename Eastman AQ. These water dispersible copolyesters are saline and body fluid insoluble and are typically low molecular weight, branched copolyesters containing sulfonomer. Information containing the chemical synthesis of such polyesters may be found in U.S. Pat. Nos. 5,543,488 and 5,552,495, incorporated herein by reference. Lighter color and low odor modifications of such water dispersible copolyester are also contemplated, particularly for nonwoven applications in which odor and color tend to be important characteristics. The preferred water dispersible copolyesters are those which exhibit an intrinsic viscosity of about 0.6 IV or less and more preferably about 0.4 IV or less and most preferably for low application temperature hot melt adhesives, 0.2 IV or less. In terms of molten viscosity, these ranges correlate to a Brookfield viscosity ranging from about 5,000 to about 40,000 cPs at 350° F. (177° C.).

Additionally, the hot melt adhesive compositions of the present invention may further comprise other compatible polymers which tend to be too crystalline to use alone as the base polymer in a pressure sensitive adhesive composition. Representative examples include a variety of crystalline polyolefins, particularly homopolymer, copolymers are terpolymers or ethylene and propylene such as medium and high density polyethylene, propylene and homogeneous ethylene/alpha-olefin interpolymer having a density greater than about 0.890 g/cm$^3$; ethylene vinyl acetate (EVA) copolymers, copolymers of ethylene and methyl acrylate (methacrylates as well as acrylates) also known as EMA, copolymers of ethylene and n-butyl acrylate also known as ENBA, as well as others.

Tackifying resins are added to the adhesive compositions to increase tack, peel values, loop tack values and specific adhesion. The adhesive composition of the present invention preferably comprises at least one tackifying resin in an amount ranging from about 10 wt-% to 70 wt-%, preferably from about 30 wt-% to about 65 wt-%, and more preferably from about 40 wt-% to about 65 wt-%. In some instances, wherein the polymer itself exhibits sufficient tack, the present invention also contemplates adhesive pellets comprising no tackifying resin at all. The Applicants surmise certain neat polymers, particularly those having a relatively low molecular weight, in combination with a high alpha-olefin content or alternatively high diblock content (in the case of block copolymer) would exhibit such properties.

In general, tackifying resins useful herein include aliphatic, cycloaliphatic and aromatic hydrocarbons and modified hydrocarbons and hydrogenated derivatives; terpenes and modified terpenes and hydrogenated derivatives; rosins and modified rosins and hydrogenated derivatives; and mixtures thereof. Solid tackifying resins have a ring and ball softening point of between about 70° C. and 150° C. whereas liquid tackifying resins are flowable at ambient temperature. Commercially available liquid tackifying resins include Escorez® 2520, a hydrocarbon resin with a pour point of 20° C., available from Exxon Chemical Co.; Regalrez® 1018, an aromatic hydrocarbon resin with a pour point of 18° C., available from Hercules, Inc. (Chicago, Ill.); and Sylvatac® 5N, a modified rosin ester with a pour point of 5° C., available from Arizona Chemical Co. (Panama City, Fla.).

Tackifying resin which are predominantly aliphatic are known to associate primarily with the mid-block portion of a block copolymer. As the aromaticity of resin increases, the resin will tend to become increasing compatible with the end-block of a block copolymer. High softening point mid block compatible tackifying resins include Eastotac® E, R, L and W series, cycloaliphatic hydrocarbon resins having varying degrees of hydrogenation available in softening points of 100° C., 115° C., 130° C. and 140° C., a supplied by Eastman Chemical Co.; Escorez® 5400 series as well as styrenated and high softening point dicyclopentadiene based resins from Exxon Chemical Co. and Regalrez® T-140 available from Hercules, Inc., and 140° C. softening point rosin ester available from Union Camp.

Examples of useful aromatic tackifying resins include the Endex® series of resins, manufactured as a copolymer of modified styrene with softening points ranging from 152° C. to 160° C. and the Kristalex® series of alpha-methyl styrene resins ranging in softening point from 70° C. to 140° C., both available from Hercules, Inc. (Wilmington, Del.); as well as polyphenylene ether, particularly preblended with tackifying resin, and coumarone indene resins.

Mixed aliphatic-aromatic tackifying resins are typically predominantly aliphatic and are hence primarily associated with the mid-block, yet comprise aromatic constituents at amounts up to about 30 wt-% with respect to the weight of tackifying resin. Commercial examples include MBG-275 available from Hercules, Inc. and Escorez® 5600 series, available from Exxon (Houston, Tex.).

Water dispersible resins include those resins having functional groups such as hydroxyl groups (—OH), acid groups (—COOH) or ester groups (—COOR). Such resins include terpene phenolic tackifying resins such as Nirez® V-2040, rosin acid tackifying resins such as Sylvatac® 140 from Arizona Chemical Co. (no longer commercially available); Dymerex® resin, a polymerized dimer acid; as well as the DE series and Foral® series of rosin acids available from Hercules, Inc.

The hot melt pressure sensitive adhesives of the present invention may comprise a plasticizer at a concentration from 0 wt-% to about 50 wt-%. For extrudeable grade HMPSAs it is preferred to minimize the concentration of liquid diluents, whereas for conventional HMPSAs applications, the compositions preferably employ about 10 wt-% to about 40 wt-% plasticizer, and more preferably from about 15 wt-% to about 30 wt-%.

A plasticizer is broadly defined as a typically organic composition that can be added to a thermoplastic composition to improve extrudability, flexibility, workability and stretchability in the finished adhesive. Any material which flows at ambient temperatures and is compatible with the block copolymer may be useful. The plasticizers useful in the present invention may include mineral based oils and petroleum based oils, liquid resins, liquid elastomers, polybutene, polyisobutylene, functionalized oils such as glycerol trihydroxyoleate and other fatty oils and mixtures thereof. The most commonly used plasticizers are oils which are primarily hydrocarbon oils that are low in aromatic content and are paraffnic or naphthenic in character. The oils are preferably low in volatility, transparent and have as little color and odor as possible. This invention also contemplates the use of olefin oligomers, low molecular weight polymers, vegetable oils and their derivatives and similar plasticizing oils.

Examples of useful plasticizers include Calsol® 5120, a naphthenic petroleum based oil available from Calumet Lubricants Co. (Indianapolis, Ind.); Kaydol® White Mineral Oil, a paraffinic mineral oil available from Witco Corp. (NY, N.Y.); Parapol® 1300, a liquid butene homopolymer available from Exxon Chemical Co. (Houston, Tex.); Indopol® H-300, a liquid butene homopolymer, available from Amoco Corp. (Chicago, Ill.); as well as a variety of 500 second or 1200 second naphthenic process oils. These plasticizers are useful in amounts from 0 wt-% to about 50 wt-%, preferably from about 10 wt-% to about 40 wt-% and more preferably from about 10 wt-% to about 30 wt-%, for the hot melt pressure sensitive compositions. The invention further contemplates a portion of the oil being present in an encapsulated form.

An incremental amount of wax may be added to the adhesive composition to increase the cohesive strength and/or heat resistance at amounts from about 0.1% to about 10% by weight of the adhesive, preferably from about 2% to about 8% by weight of the adhesive and most preferably from about 4% to about 6% by weight of the adhesive. In general, the addition of wax causes the open time of the adhesive to decrease, limiting the time frame within which a bond may be formed between two substrates. The more wax which is added, the shorter the open time becomes. Additionally, higher amounts of wax, particularly polar waxes, adversely affect the adhesion of a pressure sensitive adhesive causing a decrease in loop tack values and/or peel values. If these values become too low, the adhesive may be referred to as going "dead," which means that the tack of the adhesive has decreased to a point where the adhesive is no longer useful as a pressure sensitive adhesive.

As is known in the art, various other components can be added to modify the tack, color, odor, etc., of the thermoplastic composition. Additives such as antioxidants such as hindered phenolics (Irganox™ 1010, Irganox™ 1076), phosphites (for example, Irgafos™ 168), ultraviolet stabilizers, pigments, and fillers, can also be included in the formulations.

The resulting non-tacky pellets are suitable for extrusion by well known extrusion processes using conventional extrusion equipment. Advantageously, the pellet may be readily supplied to a conventional hopper feeder (which moves polymeric resin pellets by vacuum) for extrusion, mixing, and conventional hot melt adhesive melt tanks.

The pelletized thermoplastic adhesive composition of the present invention can exhibit a spectrum of properties, including cohesively failing hot melts for resealable adhesive closures, and various removable and permanent grade tape and label applications. Example include nonwoven applications for positioning of feminine napkins, diaper fastening systems, and disposable article construction, in the automotive industry where hot melt pressure sensitive adhesives are used for assembly applications, and for medical devices and bandages.

Pressure sensitive adhesives are often times coated onto a primary substrate, covered with release liner and then shipped and stored for use-at a later date. An end user will then apply the adhesive coated substrate to a secondary substrate. Examples of such applications are various labeling applications, diaper tapes, bandages and band aids and feminine napkins which are adhered to panties. Alternatively, the adhesive may be coated to a first substrate and bonded to a second substrate being the same or different than the first substrate in-line.

The invention is further exemplified in the following non-limiting examples:

EXAMPLES

Test Methods

1. Melt Viscosities

The melt viscosities of the hot melt adhesives were determined on a Brookfield Thermosel Viscosmeter Model DV-II+. using either a number 21 or 27 spindle.

2. Specific Gravity

The specific gravity was determined using test method ASTM D792 with isopropyl alcohol as the liquid.

3. Mettler Softening Point

The Mettler softening points are determined using test method ASTM D3461.

4. 180° Peel Adhesion to Stainless Steel

Peel values were determined using test method #PSTC- 1. About 1 mil adhesive film is coated onto polyester (Mylar®) film out of a solvent blend using a Baker Applicator. Samples are then cut into 1 inch×8 inch strips (2.54 cm×20.32 cm) for determining peel values.

5. Loop Tack, Quick Tack or Quick Stick

A film of adhesive about 1 mil thick is coated onto polyester (Mylar®) film out of a solvent solution. The film is allowed to dry for a minimum of 24 hours. The film is then mated with release liner, and cut into 1 inch×5 inch strips (2.54 cm×12.7 cm). A test sample is then inserted into a Chemsultants International Loop Tack Tester with the adhesive side facing out (release liner removed). The Loop Tack Tester automatically records the tack value in oz/in$^2$.

6. Dynamic Temperature Steps

Storage modulus, G', at 25° C. and Tg were determined using a Rheometrics Scientific Dynamic Mechanical Spectrometer Model # RDS7700. The parallel plates used had a 25 mm diameter and a 1.502 mm gap. The instrument was set to a frequency of 10 rads/sec and temperature sweep was performed from 180° C. to −50° C.

7. Blocking Evaluation

A 1.8" (4.6 cm) diameter disk on the end of a rod (resembling a bar-bell) is placed in a cylindrical tube having an inside diameter of about 5 ½ (14.0 cm) inches. Four pounds (1.8 kg) of adhesive pellets are poured into the tube on top of the disk surrounding the rod. Four pounds (1.8 kg) of adhesive pellets results in about a 6–8" (15.2–20.3 cm) height within the cylinder, approximately equal to the height of pellets in a 25# (11.3 kg) box. The apparatus is conditioned at various temperatures such as ambient temperature (25° C.), 100° F. (38° C.), and 120° F. (49° C.) and higher; for various time intervals such as 24 hours, and 1–2 weeks. Additionally, a weight ranging in mass from about 5 lbs. to about 20 lbs. (about 2.3 kg to about 9 kg) may be positioned on top of the rod to increase the pressure. After conditioning the apparatus at the chosen temperature for the chosen amount of time, a force measuring device is attached to the rod at the end opposite the disk. The force measuring device is pulled upward at a rate of about 3–5 seconds and the removal force of the disk measured by the force measuring device.

8. Shear Adhesion Failure Temperature (SAFT)

The adhesion was cast from a solvent blend as a 1 mil film using a Baker Applicator on a 2 mil gauge polyester (Mylar) film. The adhesive to solvent ratio is generally 1:1. The adhesive film was allowed to dry. Release liner was placed over the top of the film and 4 inch (10.2 cm) squares were then cut from the film. A 1 inch×4 inch (2.5 cm×10.2 cm) area was marked and mylar film placed over the top of this. This was then cut into four samples, each having a 1 inch×1 inch (2.5 cm×2.5 cm) bonded area. The bonds were allowed to dwell for 12 hours and then placed in a programmed oven with a 500 g weight using a shear mode. The oven was started at 25° C. and ramped at 25° C. per hour for three hours. The oven automatically recorded the temperature at which the sampies failed cohesively.

Example 1

HL-2053, a hot melt pressure sensitive adhesive available from H.B. Fuller Company (St. Paul, Minn.), was coated with Endex® 160, in order to determine if a continuous coating of high softening point tackifying resin would be an effective pelletizing aid. Films of the Endex® 160 resin were prepared by casting the molten resin onto release liner at 400° F. (204° C.) at various thicknesses corresponding to the desired target concentration levels. The adhesive was melted and poured into multiple puddles to form a plurality of pieces of pressure sensitive adhesive. The adhesive samples were placed on the tackifying resin film to fully coat the surface. The samples were then placed on top of each other and placed in a forced air oven at 105° F. (41° C.) for 120 hours. Periodic evaluation of the samples was done to note any sign of blocking. At the end of the 120 hour time cycle, the samples were removed, evaluated for blocking, then dissolved in solvent to generate films for 180° peel adhesion testing. The results of the blocking test and 180° peel adhesion test are reported in Table A.

The values reported in Table A indicate that the peel adhesion is essentially unaffected and slightly improved by the addition of tackifying resin concentration up to at least 2.5 wt-%. A decrease in peel adhesion is noted at concentrations of 15 wt-%, and particularly 25 wt-% tackifying resin. However, since the relationship is linear in this region and the 15 wt-% sample was only slightly outside the target range, (<10% change), the Applicants surmise that concentrations up to about 10 wt-% tackifying resin would not adversely affect the adhesive characteristics. Higher concentrations would also be acceptable provided the tackifying resin concentration in the adhesive is reduced by an amount about equal to the amount intended to be applied as the pelletizing aid on the surface. Further, if a predominantly aliphatic tackifying resin was employed, which associates with the mid-block rather than end-block, as in the case of the Endex® 160, concentrations up to about 20 wt-% tackifying resin are surmised to be acceptable.

TABLE A

| Example Number | Tackifying Resin Concentration | Coating Type | Peel Value Lbs/in | Blocking Results |
| --- | --- | --- | --- | --- |
| Control | 0.0% | None | 6.4 | 100% complete blocking |
| 3A | 2.5% | Endex ® 160 | 6.8 | No indication of blocking present |
| 3B | 15.0% | Endex ® 160 | 5.4 | No indication of blocking present |
| 3C | 25.0% | Endex ® 160 | 2.3 | No indication of blocking present |
| Comp. A | 4.5% | Zonester ® 100 | 6.7 | Blocking started to occur on multiple spots of surface area. |

Blocking Test Conditions:
Temperature=105° F. (41° C.)
Duration or Dwell Time: 120 hours
Loading Level=250 grams Example 2

HL-1484, a hot melt adhesive composition available from H. B. Fuller Company, having the rheological properties depicted in FIGS. B and C, was formed into pellets and coated with pelletizing aid by means of a two-step process of applying binder and powder. The adhesive was formed into pellets using commercially available underwater pelletizing equipment using the following process conditions:

Adhesive Temperature: 185° F. (85° C.)
Pelletization Rate: 80 lbs./hr (36 kg/hr)
Water Temperature: 73° F. (23° C.)
Pellet weight: 15.4 g/100 pellets A vinyl acetate emulsion and defoamer was employed at a minimal concentration as a processing aid. The cooled pellets were conveyed to a rotating vessel where Reynco 8633, a thermoplastic binder was dripped onto the pellets at a concentration of 2 wt-%. The binder coated pellets were then conveyed to another vessel in which powdered ENDEX 160, having a particle size of 5–25 microns was coated onto the binder coated pellets at a concentration of 4 wt-% forming a continuous composite coating of binder and powder. The pelltized adhesive was stored for 6 months at a temperature ranging from about 68° F. to about 88° F. (about 20° C. to about 31° C.) in a cylindrical container having a diameter of 20" (50.8 cm) and a container height of about 2 feet (pressure =$\pi \times$density$\times$height, density=40 lbs/ft$^3$±3). The pellets were non-blocking and free-flowing.

Example 3

Another HMPSA available from H.B. Fuller Company, HL-208 1, was formed into pellets and coated with pelletizing aid by means of a two-step process of applying binder and powder as described in Example 2. SFI, a variation of Michelman 4983 available from Michelman Inc. was employed as the binder at a concentration of 1.5 wt-% whereas powdered Endex-160 (same as Example 2) was employed as the powder at a concentration of 3 wt-%. These pellets were also stored for 6 months as described in Example 2 and found to be free-flowing.

Example 4

HL-2593, another HMPSA available from H.B. Fuller Company, was formed into pellets and coated with pelletizing aid by means of the two-step process of applying binder and powder pellets as described in Example 2. The storage modulus (G') of this adhesive is depicted in FIG. B. The same binder and powder as Example 2 were employed at a binder concentration of 1 wt-% and a powder at a concentration of 2 wt-%.

Comparative B pellets were produced from the same hot melt adhesive employing a wax as the pelletizing aid. The pelletizing aid was applied by contacting the extruded hot melt adhesive ribbons and pellets with cooled water containing Shamrock S-395-N5, a polyethylene wax available from Shamrock Technology Inc., Newark, N.J. The resulting pellets contained 0.25 wt-% present of wax on the surface of the pellet. The blocking resistance of the pellets produced were tested under a variety of pressures and temperatures. The data was fitted to an experimental design model. The contourplots generated from the design model are depicted in FIGS. D–G. Preferably, the target force required to separate the pellets is less than about 10 lbs (4.5 kg). Hence, the area-below the dashed line represents the storage conditions for which the pellets resist blocking. In the case of Comparative B (FIGS. D and E), for a container height of 10 inches (25.4 cm), the temperature needs to be constrained to less than about 105° C. In contrast, FIGS. F and G depict there are no temperature constraints for this height within the temperature range tested for the pellets produced using the two-step process. For container heights of about 40 inches (101.6 cm), the storage temperature needs to be maintained below about 85° C. for the wax coated pellets, Comparative B. In contrast, by increasing the pelletizing aid concentration on the pellet, as in the case of FIGS. E and F, the pellets remain free-flowing at temperatures up to about 110° C.

Thus, by employing a process that results in a pellet having a uniform substantially continuous coating of pelletizing aid present in an amount greater than 1 wt-%, the resulting pellets may be stored under a much broader range of conditions, particularly for the one week storage condition, yet remain free-flowing. Interestingly, the contourplot of the pellets coated with the two-step process exhibits a "sweet spot" in the area between 5 and 6 lbs. (2.3 and 2.7 kg), meaning the blocking resistance of the pellets is unaffected by heat and pressure variables in that region.

Comparative C was produced with the preferred two-step process employing 2 wt-% Marcus 200 wax, available from Marcus Oil and Chemical, (Houston, Tex.) in place of the tackifying resin powder.

All three conditions were tested to determine the effect of the pelletizing aid on the adhesive characteristics. The results were as follows.

|  | Example 4 | Comparative B | Comparative C |
| --- | --- | --- | --- |
| Loop Tack | 84 oz. (2.4 g) | 96 oz. (2.7 g) | 56 oz. (1.6 g) |
| 180° Peel | 5.4 lbs. (2.4 kg) | 5.8 lbs. (2.6 kg) | 3.8 lbs. (1.7 kg) |
| SAFTS | 210° F. (99° C.) | 217° F. (103° C.) | 203° F. (95° C.) |

In the case of Example 4 and Comparative B, the pelletizing aid does not diminish the adhesive performance. However, as previously discussed, Example 4 exhibits a much broader range of storage conditions. In the case of Comparative C, the adhesive characteristics are significantly diminished.

Example 5

Example 5 depicts another means of producing a continuous coating of pelletizing aid. In this example a film-forming acrylic dispersion is employed as the sole pelletizing aid. A portion of HL-2053, the same adhesive as employed in Example 1, was submerged twice in a commercially available acrylic emulsion PD-2044, also available from H.B. Fuller Company. The rheological properties of HL-2053 are depicted in FIGS. B and C. The emulsion was allowed to dry between applications to increase the concentration of acrylic polymer pelletizing aid. At a concentration of about 2 wt-% the portion of adhesive was untacky to the touch. Due to the flexibility of the acrylic employed as the pelletizing aid, the surface of the adhesive portion would conform to deformations such as bending and stretching. At temperatures of 120° F. (49° C.), the adhesive portions coated with the dried acrylic emulsion were separable, yet were adhered to each other at some locations. The Applicants surmise that increasing the concentration of the acrylic emulsion to about 3 wt-% to about 6 wt-% will rectify the blocking problem.

Example 6

A pelletizing aid composition comprising 15 part Kraton® G (Shell Chemical Company, Houston, Tex.), 40 parts of an 80° C. –90° C. melt point microcrystalline wax having a relatively narrow molecular weight distribution, and 35 parts 120° C. softening point hydrogenated DCPD tackifying resin were combined molten into a mixture. The mixture can then be cryogenically ground into a powder and the powder dispersed in an aqueous solution for use as a pelletizing aid. The pelletizing aid can be applied to a hot melt adhesive pellet by means of the previously described two-step process at concentrations up to at least 2 wt-% without detrimentally affecting the properties. The powdered composition can also be adhered to the adhesive pellet surface by means of magnetic assisted impact coating.

Alternatively, this compounded pelletizing aid composition can be coated onto the adhesive pellet molten by spraying onto the adhesive pellets or submerging the cooled adhesive pellets in a molten bath of pelletizing aid composition.

Example 7

NP-2126, a water soluble polyamide available form H.B. Fuller Company, was ground into a powder having a particle size ranging from about 10 to 900 μm, averaging about 300 μm. As in Example 6, the pelletizing aid can be applied to a hot melt adhesive pellet by means of the two-step process or by magnetic assisted impact coating.

Further, in view of the fact that this polyamide is water soluble, it may be dissolved in water and applied in the form of a solution. The Applicants surmise that a water soluble polyamide produced by reacting 39.37 adipic acid with 58.41 parts of a 4,7,10-trioxatridecane-1,13 diamine in combination with about 0.72 parts stearic acid (Emersol-132), having a viscosity of about 10,000–12,000 cPs at 400° F. (204° C.) is preferred as a pelletizing aid.

Example 8

In this example, a hot melt adhesive composition is coated with a binder twice and then with a powder. This is a variation of the previously described two-step process. HL-2593 was pelletized and coated with 3 wt-% of WB-8206, a latex commercially available from H. B. Fuller Company, in order to provide an oil resistant barrier. The coated pellets were spread out on a polyolefin film for drying. The next day, the dried pellets were placed into a cup and coated with 3 wt-% binder, namely Reynco 8633. Once evenly coated, 6 wt-% of Endex 160 powder was added. The resulting pellets were free-flowing and non-blocking under moderate pressures. The coated pellets were melted to check for compatibility and adhesive characteristics. The pelletizing aids (both binders and powder) were observed to be miscible with the adhesive composition. Further, upon cooling the mixture of pelletizing aid and adhesive exhibited a high degree of surface tack.

Example 9

In this example, the two step process of applying binder and powder is repeated to increase the concentration of pelletizing aid. HL-8128-X, a hot melt pressure sensitive adhesive available from H. B. Fuller Company having a G' at 25° C. of $4.9 \times 10^5$ dynes/cm$^2$ and a G' at 60° C. of $1.1 \times 10^5$ dynes/cm$^2$ was into pellets. The cooled pellets were coated with 5 wt-% SF1 binder and then with 10 wt-% of powdered Endex 160 tackifying resin. The process was then repeated for a second pass such that an additional 5 wt-% binder and an additional 10 wt-% powdered Endex 160 tackifying resin totaling 30 wt-% pelletizing aid (10 wt-% binder and 20 wt-% powder.) This level of pelletizing aid is anticipated to have a measurable effect on the adhesive properties. Hence, to counterbalance this effect, HL-8128-X shall be prepared in the absence of about 15 wt-% to about 25 wt-% tackifying resin such that the mixture of this adhesive precursor and the pelletizing aid result in the desired properties.

Example 10

This example demonstrates the utility of a dual-purpose pelletizing aid. A chemical blowing agent was employed as the pelletizing aid on hot a melt adhesive pellet. HL-2502, available from H.B. Fuller Company, was formed into pellets and then coated with the preferred two-step coating method. The pellets were first coated with 3 wt-% Rovace 661 binder and then with 5 wt-% Hydercerol CF powder, a chemical blowing agent available from B.I. Chemicals. The resulting pellets were free-flowing. The pellets were then fed into a melt extruder and extruded to produce an adhesive foam having a foam density of 0.68 g/cc.

What is claimed is:

1. A method for making a pressure-sensitive hot melt adhesive composition pellet comprising the steps of:
    a) selecting at least one non-blocking agent comprising an ingredient of the adhesive composition for use as an outer layer;
    b) preparing said adhesive composition in pellet form such that the amount of said ingredient present in said pellet is reduced by an amount about equal to the amount of said ingredient to be applied as said outer layer of said pellet; and
    c) applying said outer layer to said adhesive composition pellet; wherein said outer layer is substantially continuous.

2. The method of claim 1 wherein said at least one non-blocking agent is selected from the group consisting of thermoplastic polymers, tackifying resins, and mixtures thereof.

3. The method of claim 2 wherein said thermoplastic polymer is water-sensitive.

4. The method of claim 1 wherein said at least one non-blocking agent comnrises a tackifying resin having a melting point of greater than about 120° C.

5. The method of claim 4 wherein said tackifying resin is substantially aliphatic.

6. The method of claim 1 further comprising the step of cooling the pressure-sensitive hot melt adhesive compositions pellets to a temperature ranging from about −45° C. to about 50° C.

7. The method of claim 1 wherein said at least one non-blocking agent comprises
    at least one tackifying resin and at least one film former.

8. The method of claim 7 wherein said at least one film former is selected from the group consisting of a film forming solution, emulsion and dispersion.

9. The method of claim 8 wherein said at least one film former is applied to said adhesive composition prior to the application of said at least one tackifying resin.

10. A method of making a pellet comprising the steps of:
    a) providing hot melt adhesive composition pieces ranging in size from 3 mm to about 10 mm;
    b) coating said pieces with a pelletizing aid such that said pelletizing aid forms substantially continuous uniform coating and said pelletizing aid does not adversely affect the adhesive composition.

11. The pellet of claim 10 wherein said adhesive composition is pressure sensitive, having a storage modulus, G', at 25° C. of less than about $5\times10^6$ dynes/cm$^2$.

12. The method of claim 10 further comprising the step of cooling the hot melt adhesive compositions pieces to a temperature ranging from about −45° C. to about 50° C.

13. The method of claim 10 wherein said coating is achieved by applying molten pelletizing aid to said adhesive pellets.

14. The method of claim 10 wherein said coating is achieved by magnetically assisted impact coating.

15. The method of claim 10 wherein said coating is achieved by means of a film-forming solution, emulsion, or dispersion.

16. The method of claim 10 wherein said coating is achieved by coating the adhesive pieces with a thermoplastic binder and coating the binder coated pieces with a powder.

17. The method of claim 16 further comprising heating said coated pellets to fuse the powder.

18. The method of claim 10 wherein said pelletizing aid is present in an amount of about 2 to about 30% by weight.

19. The method of claim 10 wherein said pelletizing aid is water-sensitive.

* * * * *

UNITED STATES PATENT AND TRADEMARK OFFICE
CERTIFICATE OF CORRECTION

PATENT NO. : 6,238,732 B1
DATED : May 29, 2001
INVENTOR(S) : Janelle C. Cameron et al.

It is certified that error appears in the above-identified patent and that said Letters Patent is hereby corrected as shown below:

Column 1,
Line 62, "Seep. 3" should be -- See p. 3 --.

Column 2,
Line 58, "these types" should be -- These types --.

Column 9,
Line 50, "inthat nozzles" should be -- in that nozzles --.

Column 17,
Line 26, "ENBA," should be -- EnBA, --.

Column 20,
Line 2, "(Mylar$^4$)" should be -- (Mylar$^®$) --.
Line 57, "the sampies failed" should be -- the samples failed --.

Column 22,
Line 17, "HL-208 1" should be -- HL-2081 --.

Column 24,
Line 48, "was into pellets." should be -- was formed into pellets --.

Column 25,
Line 27, "comnrises" should be -- comprises --.

Signed and Sealed this

Twenty-second Day of April, 2003

JAMES E. ROGAN
*Director of the United States Patent and Trademark Office*